(12) United States Patent
Kim et al.

(10) Patent No.: US 12,116,093 B2
(45) Date of Patent: Oct. 15, 2024

(54) FISHING TOOL LOSS MONITORING SYSTEM AND METHOD

(71) Applicant: GWANGJU INSTITUTE OF SCIENCE AND TECHNOLOGY, Gwangju (KR)

(72) Inventors: Ki Seon Kim, Gwangju (KR); Myoung Shin Kwak, Gwangju (KR); Pranesh Psthapit, Gwangju (KR); Min Seok Kim, Gwangju (KR)

( * ) Notice: Subject to any disclaimer, the term of this patent is extended or adjusted under 35 U.S.C. 154(b) by 533 days.

(21) Appl. No.: 17/530,804

(22) Filed: Nov. 19, 2021

(65) Prior Publication Data

US 2022/0161910 A1    May 26, 2022

(30) Foreign Application Priority Data

Nov. 25, 2020    (KR) ........................ 10-2020-0160489

(51) Int. Cl.
| | |
|---|---|
| *B63B 79/40* | (2020.01) |
| *A01K 97/12* | (2006.01) |
| *B63B 22/00* | (2006.01) |
| *B63B 79/10* | (2020.01) |
| *G01K 3/00* | (2006.01) |

(Continued)

(52) U.S. Cl.
CPC ............ *B63B 79/40* (2020.01); *A01K 97/125* (2013.01); *B63B 22/00* (2013.01); *B63B 79/10* (2020.01); *G01K 3/005* (2013.01); *G01S 19/14* (2013.01); *B63B 2022/006* (2013.01); *H04L 67/12* (2013.01)

(58) Field of Classification Search
CPC ... B63B 79/40; B63B 22/00; B63B 2022/006; G01K 3/005; G01S 19/14; H04L 67/12
See application file for complete search history.

(56) References Cited

FOREIGN PATENT DOCUMENTS

| KR | 101858845 B1 | * | 5/2018 | ............ B63B 45/08 |
|---|---|---|---|---|
| KR | 101896000 B1 | * | 10/2018 | ........... B63B 22/166 |

(Continued)

OTHER PUBLICATIONS

English Specification of 10-2018-0131523.
English Specification of 10-2020-0009450.
English Specification of 10-2020-0050608.

*Primary Examiner* — Stephen P Avila
(74) *Attorney, Agent, or Firm* — ANTONIO HA & U.S. PATENT, LLC (57) ABSTRACT

According to an embodiment, a fishing tool loss monitoring system comprises at least one buoy providing sensing information and buoy identification information and buoy position information, a fishing vessel terminal device providing fishing vessel information including fishing vessel identification information, fishing vessel position information, the fishing tool identification information, and the buoy position information, and a land control center performing transmitting/receiving information to/from the fishing vessel terminal device or the buoy through a communication network to gather the sensing information including underwater temperature information and overwater temperature information from the buoy during a preset time, measuring a speed of the buoy using the buoy position information when a difference between respective averages of the underwater temperature information and the overwater temperature information falls outside a preset error range.

5 Claims, 6 Drawing Sheets

(51) Int. Cl.
*G01S 19/14* (2010.01)
*H04L 67/12* (2022.01)

(56) References Cited

FOREIGN PATENT DOCUMENTS

| | | |
|---|---|---|
| KR | 10-2018-0131523 | 12/2018 |
| KR | 10-2020-0009450 | 1/2020 |
| KR | 10-2020-0050608 | 5/2020 |

\* cited by examiner

FISHING TOOL LOSS MONITORING SYSTEM AND METHOD

CROSS-REFERENCE TO RELATED APPLICATION(S)

This application is based on and claims priority under 35 U.S.C. 119 to Korean Patent Application No. 10-2020-0160489, filed on Nov. 25, 2020, in the Korean Intellectual Property Office, the disclosure of which is herein incorporated by reference in its entirety.

TECHNICAL FIELD

The disclosure relates to a fishing tool loss monitoring technology for notifying a fishing tool user or manager of a loss of a buoy or fishing tool.

DESCRIPTION OF RELATED ART

The description of the Discussion of Related Art section merely provides information that may be relevant to embodiments of the disclosure but should not be appreciated as necessarily constituting the prior art.

In general, a fishing tool (or fishing gear) is a tool used for catching or collecting, e.g., fish, directly in the water. To identify the position of the fishing gear installed in the sea, a buoy or a global positioning system (GPS) is conventionally used.

A buoy is an indicating means formed of a floating body on the surface of the water. A buoy is connected with a fishing tool to indicate the position of the fishing tool. Use of buoys are cheaper than use of the GPS in positioning fishing tools but, due to the need for the worker to determine the position of each fishing tool with the naked eye, does not allow for precise, real-time positioning.

As compared with using buoys, GPS positioning may easily determine the position of the fishing tool through a GPS module (e.g., a GPS transceiver) equipped in the fishing tool from a remote site. However, this way requires use of an expensive GPS module. In particular, if the fishing gear is lost and sunk, the GPS module is sunk as well, so that it may be impossible to determine the position of the lost fishing tool.

Further, the conventional GPS module or buoy simply provides information about the position of the fishing tool but does not provide other information, such as seawater temperature, flow speed, wind speed, etc. Thus, it may be difficult to effectively manage the fishing tool in the sea.

To address the issues, there have been introduced buoys equipped with various sensors, such as a water pressure sensor, tension sensor, and acceleration sensor.

However, such buoys require a separate electronic system, e.g., a control circuit, for utilizing various pieces of sensor information, which leads to an increase in the manufacturing costs and difficulty in installing, e.g., a tension sensor or a rope for preventing loss of the fishing tool. Further, conventional methods for detecting a loss or stealing of a buoy frequently cause a malfunction of the alarm, resulting in unnecessary work for the user or manager to release the alarm or difficulty in precise positioning.

SUMMARY

Embodiments of the disclosure aim to recognize a loss or stealing of a fishing tool or a buoy and alerting the user or manager of the fishing tool.

However, the objects of the embodiments are not limited thereto, and other objects may also be present.

According to an embodiment, a fishing tool loss monitoring system comprises at least one buoy detachably installed in a fishing tool installed in the water, providing sensing information using at least one sensor, and providing buoy identification information and buoy position information, a fishing vessel terminal device registering fishing tool identification information in the at least one buoy, communicating with the at least one buoy to identify the buoy position information, and providing fishing vessel information including fishing vessel identification information, fishing vessel position information, the fishing tool identification information, and the buoy position information, and a land control center performing a function of managing the fishing tool or a fishing vessel in a preset control area, transmitting/receiving information to/from the fishing vessel terminal device or the buoy through a communication network to gather the sensing information including underwater temperature information and overwater temperature information from the buoy during a preset time, measuring a speed (or velocity) of the buoy using the buoy position information when a difference between respective averages of the underwater temperature information and the overwater temperature information falls outside a preset error range, generating preliminary buoy loss information if the measured speed of the buoy falls outside a preset reference speed range, and providing buoy or fishing tool loss information when a distance between the fishing vessel and the buoy falls outside a preset fishing tool working radius using the fishing vessel position information and the buoy position information according to the generation of the preliminary buoy loss information. When the distance between the fishing vessel and the buoy using the fishing vessel position information and the buoy position information falls within the preset fishing tool working radius after the preliminary buoy loss information is generated, the land control center releases the generation of the preliminary buoy loss information and provides buoy position change information due to a tide.

The buoy, the fishing vessel terminal device, and a managing vessel terminal device performing a function of managing fishery, including managing the buoy or the fishing tool in a control area of the managing vessel terminal device form a main communication channel through a public long range (LoRa) network for low-power wide-area communication and, in a radio wave shadow area, release the main communication channel with the public LoRa network and form a sub communication channel through a private LoRa network.

The buoy, the fishing vessel terminal device, and the managing vessel terminal device determine a communication state through a positive/negative response signal for a traffic request and, if the positive response signal is not received within a preset reception acknowledgment time through the main communication channel, determine that the main communication channel is a communication disconnected state and form the sub communication channel through the private LoRa network.

According to an embodiment, a fishing tool loss monitoring method for monitoring a loss of a buoy or a fishing tool using the buoy comprises forming, by a land control center, a LoRa-based communication channel with a fishing vessel terminal device, a managing vessel terminal device, and the buoy, the land control center periodically obtaining buoy position information and fishing vessel information in a preset control area of the land control center and detecting and indicating, on land, whether the buoy or the fishing tool is lost, the fishing vessel terminal device registering fishing tool identification information in the buoy and managing the fishing tool identification information, the managing vessel terminal device installed in a managing vessel to perform a fishery guidance or control in a control area of the managing vessel terminal device and recover the lost fishing tool through fishing tool scanning according to buoy or fishing tool loss information, and the buoy installed in the fishing tool to provide sensing information using at least one sensor, periodically obtaining, by the land control center, the sensing information or the buoy position information through the communication channel, gathering the sensing information including underwater temperature information and overwater temperature information from the buoy during a preset time, measuring a speed (or velocity) of the buoy using the buoy position information when a difference between respective averages of the underwater temperature information and the overwater temperature information falls outside a preset error range, and generating preliminary buoy loss information if the measured speed of the buoy falls outside a preset reference speed range, when a distance between the fishing vessel and the buoy using the fishing vessel position information and the buoy position information falls outside a preset fishing tool working radius according to the generation of the preliminary buoy loss information, generating the buoy or fishing tool loss information and transmitting the buoy or fishing tool loss information to the fishing vessel terminal device or the managing vessel terminal device, by the land control center, and when the distance between the fishing vessel and the buoy using the fishing vessel position information and the buoy position information falls within the preset fishing tool working radius after the preliminary buoy loss information is generated, releasing the generation of the preliminary buoy loss information and providing buoy position change information due to a tide, by the land control center.

The fishing tool loss monitoring method may further comprise, when the difference between the respective averages of the underwater temperature information and the overwater temperature information falls within the preset error range, fetching a past average underwater temperature for a preset past time, comparing the past average underwater temperature with a current average underwater temperature and, when a result of the comparison falls outside an error range, generating the preliminary buoy loss information.

According to various embodiments, it is possible to efficiently determine or detect a loss or stealing of a fishing tool or a buoy using the communication function of a built-in sensor in the buoy or the function of gathering and analyzing data by the managing vessel without the need for installing a separate sensor or electronic circuit. Further, as it is not needed to install a rope or a tension sensor, installation of a fishing tool may be easy. Further, according to various embodiments, it is possible to ensure communication connectivity by forming a communication channel between a buoy, a fishing vessel, and a managing vessel through a private LoRa network in a shadow area.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Hereinafter, exemplary embodiments of the inventive concept will be described in detail with reference to the accompanying drawings. The inventive concept, however, may be modified in various different ways, and should not be construed as limited to the embodiments set forth herein. Like reference denotations may be used to refer to the same or similar elements throughout the specification and the drawings. However, the disclosure may be implemented in other various forms and is not limited to the embodiments set forth herein. For clarity of the disclosure, irrelevant parts are removed from the drawings, and similar reference denotations are used to refer to similar elements throughout the specification.

In embodiments of the disclosure, when an element is "connected" with another element, the element may be "directly connected" with the other element, or the element may be "electrically connected" with the other element via an intervening element. When an element "comprises" or "includes" another element, the element may further include, but rather than excluding, the other element, and the terms "comprise" and "include" should be appreciated as not excluding the possibility of presence or adding one or more features, numbers, steps, operations, elements, parts, or combinations thereof.

In the disclosure, the term 'terminal' or 'terminal device' may refer to a wireless communication device with portability and mobility, and may be any kind of handheld wireless communication device, such as a smart phone, a tablet PC, or a laptop computer. The term 'terminal' or 'terminal device' may refer to a wired communication device, such as a personal computer (PC) that may access other terminals or servers using a network. Here, the network means a connection structure capable of exchanging information between nodes, such as a plurality of terminals or servers, and examples of the network include local area networks (LANs), wide area networks (WANs), internet (world wide web (WWW)), wired/wireless data communication networks, telephony networks, or wired/wireless television communication networks.

Examples of wireless data communication networks may include, but are not limited to, 3G, 4G, 5G, 3rd generation partnership project (3GPP), long term evolution (LTE), world interoperability for microwave access (WIMAX), Wi-Fi, Bluetooth communication, infrared communication, ultrasound communication, visible light communication (VLC), and Li-Fi.

Example embodiments are described below for a better understanding of the disclosure, but the disclosure is not limited thereto. Therefore, it should be noted that any embodiment performing substantially the same function as the embodiments disclosed herein belong to the scope of the disclosure.

The components, processes, steps, or methods according to embodiments of the disclosure may be shared as long as they do not technically conflict with each other.

Hereinafter, embodiments of the disclosure are described in detail with reference to the accompanying drawings.

Figure 1:
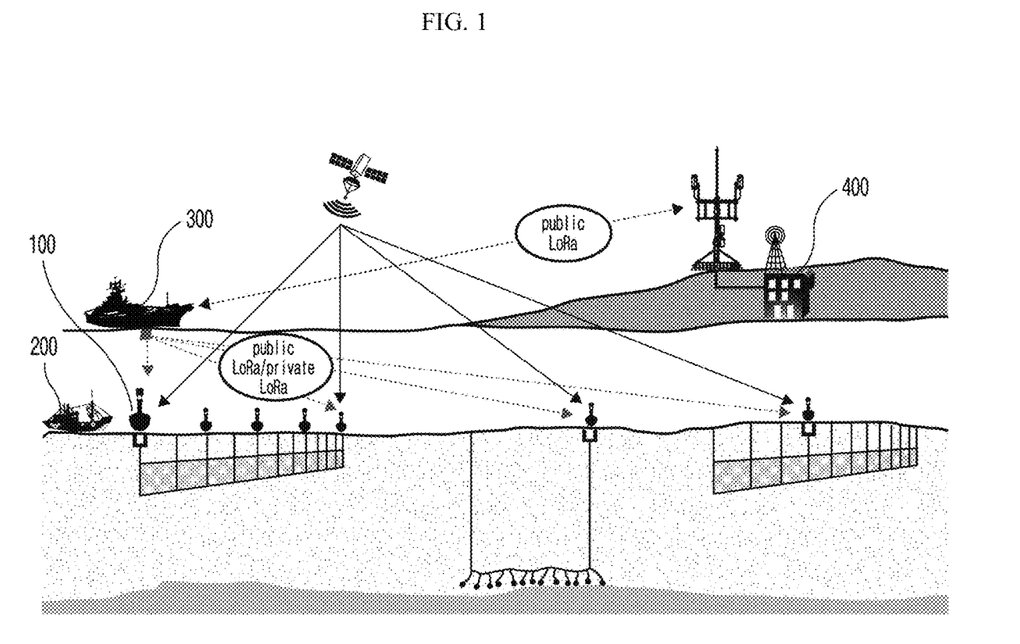
FIG. 1 is a view illustrating a configuration of a fishing tool loss monitoring system according to an embodiment.
Figure 2:
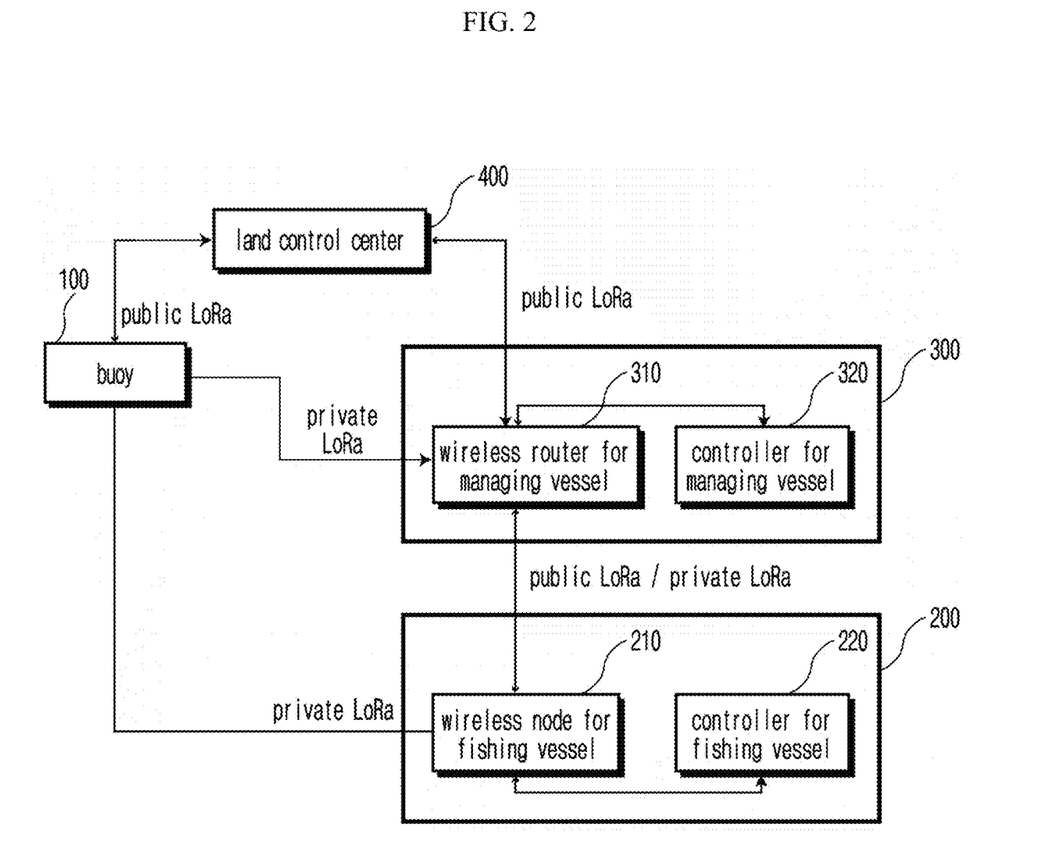
FIG. 2 is a block diagram illustrating a fishing tool loss monitoring system according to an embodiment.

FIG. 1 is a view illustrating a configuration of a fishing tool loss monitoring system according to an embodiment. FIG. 2 is a block diagram illustrating a fishing tool loss monitoring system according to an embodiment. As used herein, the term "fishing tool" may be interchangeably used with "fishing gear."

Referring to FIGS. 1 and 2, a fishing tool loss monitoring system may include at least one buoy 100, a terminal device 200 for a fishing vessel (also referred to as a fishing vessel terminal device 200), a terminal device 300 for a managing vessel (also referred to as a managing vessel terminal device 300), and a land control center 400.

The buoys 100 are detachably installed on fishing tool, e.g., gillnets, at regular intervals, provide sensing information using at least one sensor, and provides its own identification information and location information. The buoy may include various sensors, such as a temperature sensor, an acceleration sensor, a water detection sensor, or an acoustic sensor (or a sound sensor).

The fishing vessel terminal device 200 registers its own fishing tool identification information in at least one or more buoys 100, communicate with the buoy 100 to identify its own buoy position information, and provides fishing vessel information including its own fishing vessel identification information, fishing vessel position information, fishing tool identification information, and buoy position information.

Upon receiving loss information for a buoy or a fishing tool from the land control center 400, the managing vessel terminal device 300 may perform an operation for recovering the lost fishing tool through fishing tool scanning. The managing vessel terminal device 300 performs functions, such as fishing guidance or control, and needs to know or have the location of (or location information for) fishing vessels and buoys that the managing vessel transmitted 300 is in charge of.

The land control center 400 manages fishing tools or fishing vessels within a predetermined area, transmits and receives information to/from the fishing vessel terminal device 200 and the buoy 100 through a communication network, and detects a stealing or loss of the buoy 100 and notifies the fishing vessel terminal device 200 or the managing vessel terminal device 300 of the stealing or loss of the buoy or fishing tool.

Meanwhile, the fishing vessel terminal device 200 includes a wireless node 210 for the fishing vessel and a controller 220 for the fishing vessel. The managing vessel terminal device 300 includes a wireless router 310 for the managing vessel and a controller 320 for the managing vessel. The wireless node 210 is a long range (LoRa)-based gateway. The wireless node 210 is connected with a plurality of buoys 100, located within a predetermined radius (e.g., 10 Km) from the fishing vessel, through communication channels and transmit/receive information to/from the buoys 100. Further, the wireless router 310 serves as a LoRa-based wireless relay communication gateway between the buoy 100, the terminal device 200, and the land control center 400.

The controller 220 for the fishing vessel and the controller 320 for the managing vessel may be common server computers or may be other various types of devices that may function as servers. For example, the controller 220 for the fishing vessel and the controller 320 for the managing vessel each may be implemented in a computing device including a communication module (e.g., a transceiver or a communication circuit) (not shown), a memory (not shown), a processor (not shown), and a database (not shown).

The land control center 400 may receive integrated information, such as information operated in, e.g., an intelligent navigation system (INS), integrated maritime information technology (IMIT), or marine environment information system (MEIS) in the controller 220 for the fishing vessel or the controller 320 for the managing vessel, through a communication network, thereby monitoring the current state of the vessel in real-time.

The land control center 400 determines, on land, the position of at least one or more fishing tools and at least one or more buoys on land. The land control center 400 communicates with the managing vessel terminal device 300 or the fishing vessel terminal device 200 to provide weather information and sea condition information to the vessel through remote monitoring between the land, the managing vessel, and the fishing vessel. Further, the land control center 400 receives the integrated information for the vessel and enables real-time monitoring and control of the vessel, on land. For example, the land control center 400 displays the state (or condition) of the vessel, received by wireless communication (e.g., via a satellite or wireless communication modem), to the vessel and transmits MEIS meteorological information and control commands to the vessel.

Figure 3:
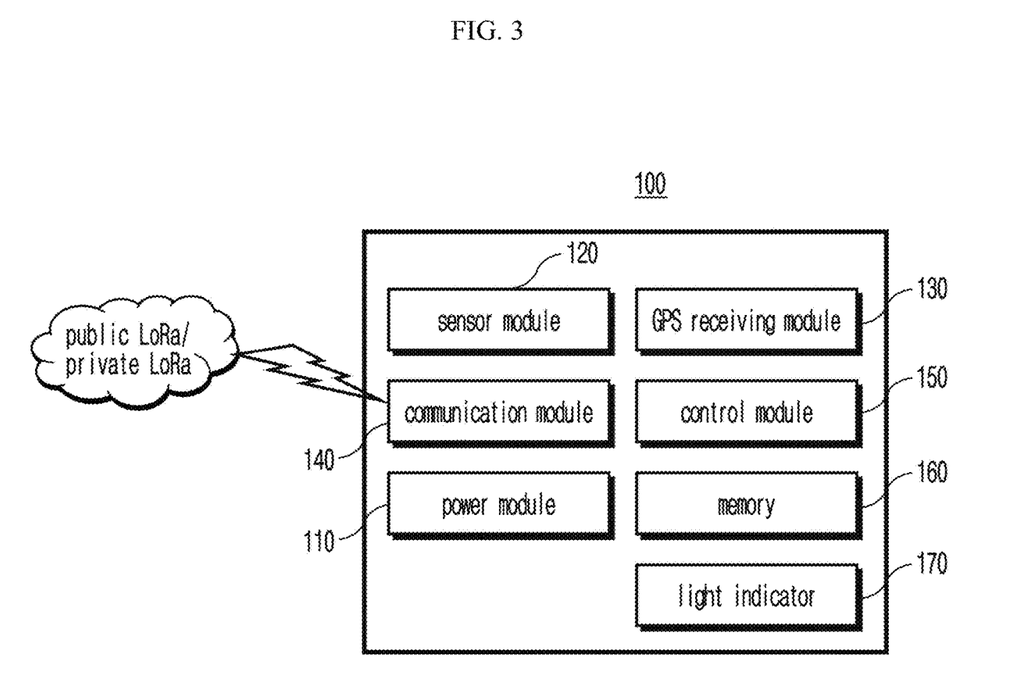
FIG. 3 is a view illustrating a configuration of a buoy according to an embodiment.

FIG. 3 is a view illustrating a configuration of a buoy according to an embodiment.

The buoy 100 may include, but is not limited to, a power module 110 (e.g., a power source), a sensor module 120 (e.g., at least one sensor), a global positioning system (GPS) receiving module 130 (e.g., a GPS receiver), a communication module 140 (e.g., a transceiver or a communication circuit), and a control module 150 (e.g., a controller).

The power module 110 provides power required for the operation of the buoy 100. The power module 110 may report the state of the battery to the fishing vessel terminal device 200 or the managing vessel terminal device 300 through the communication module 140.

The sensor module 120 may include at least one of a temperature sensor, an acceleration sensor, and an acoustic sensor (or a sound sensor), and provides sensor information detected or obtained by the sensor.

The GPS receiving module 130 provides the current location (or location information) of the buoy using a GPS signal received from a GPS satellite. The GPS receiving module 130 may receive a signal from a global navigation satellite system (GNSS) or a satellite based augmentation system (SBAS) to thereby provide location information with high accuracy.

The communication module 140 may communicate with the fishing vessel terminal device 200, the managing vessel terminal device 300, and the land control center 400 by selectively using a commercial (or public) LoRa and a private LoRa depending on the state of the radio wave. The communication module 140 may connect the fishing vessel wireless node 210 or the managing vessel wireless router 310 to a LoRa-based communication network.

The buoy 100 may further include a light indicator 170 that allows the buoy 100 or its position to be identified with the naked eye at night.

The control module 150 controls the overall operation of the buoy 100 using various programs stored in the memory 160. The memory 160 may store identification information and control information for the buoy 100 as well as a program for controlling the operation of the buoy 100.

Figure 4:
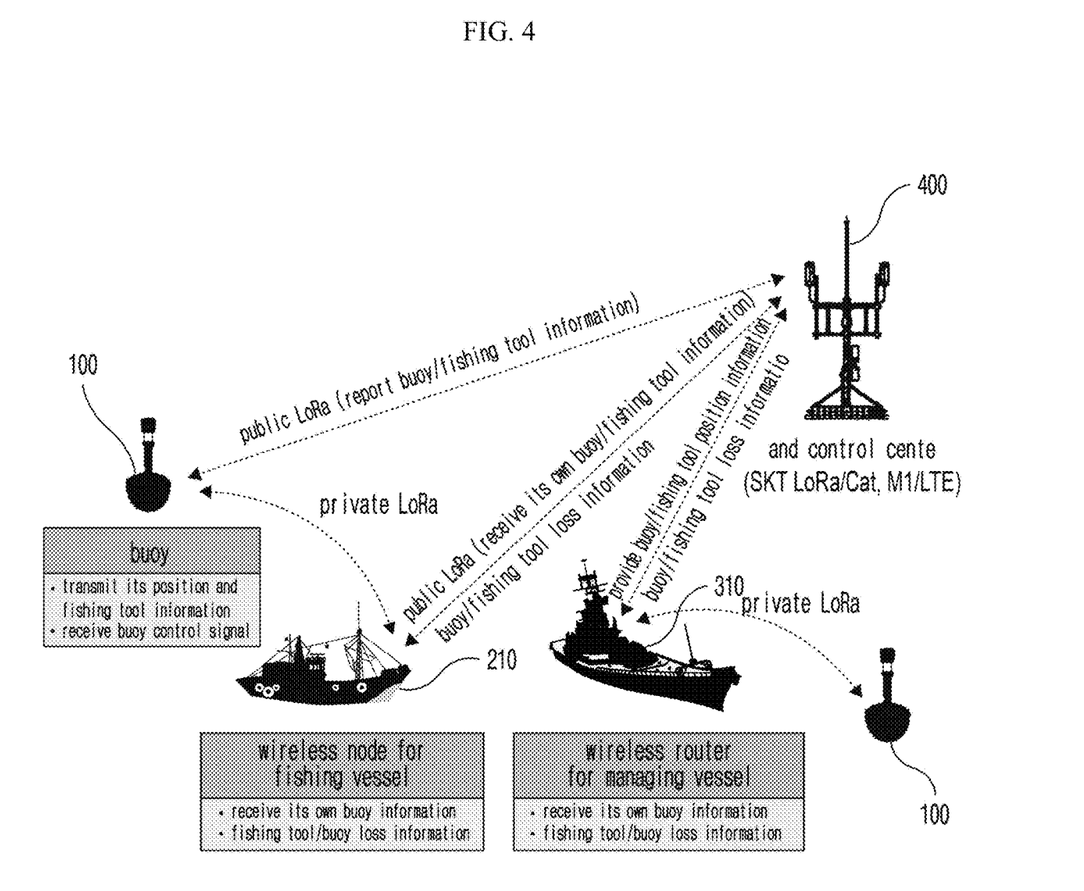
FIG. 4 is a view illustrating a process for providing a communication service in a radio wave shadow area of a fishing tool loss monitoring system according to an embodiment.

FIG. 4 is a view illustrating a process for providing a communication service in a radio wave shadow area of a fishing tool loss monitoring system according to an embodiment.

Referring to FIG. 4, the buoy 100, the fishing vessel terminal device 200, the managing vessel terminal device 300, and the land control center 400 form a communication channel based on LoRa for low-power, long-range communication.

In this case, the land control center 400 forms a main communication channel with the buoy 100, the fishing vessel terminal device 200, and the managing vessel terminal device 300 through a commercial LoRa network (e.g., a public LoRa network). Accordingly, the land control center 400 may receive a report of the location of the buoy 100 and fishing tool information from the buoy 100 and may transmit buoy control signals to each buoy 100 through the main communication channel. Further, the land control center 400 may receive position information for the buoy and fishing tool information from the wireless node 210 for the fishing vessel through the main communication channel and transmit loss information for the buoy or the fishing tool. The land control center 400 may transmit and receive information for all the buoys and fishing tools in the area controlled or managed by the managing vessel, and fishing tool loss information to/from the managing vessel wireless router 310. Accordingly, the managing vessel terminal 320 may receive a result of determination (e.g., information about loss of buoy or fishing tool) from the land control center 400, through a commercial long-term evolution (LTE) network (CAT. M1).

In a radio wave shadow area, the buoy 100, the fishing vessel wireless node 210, and the managing vessel wireless router 310 may release the main communication channel through the commercial LoRa network and establish a sub communication channel through the private LoRa network to transmit and receive information.

The buoy 100, the fishing vessel terminal device 200, and the managing vessel terminal device 300 determines the communication state through a positive/negative response signal (e.g., acknowledgment (Ack)/negative acknowledgment (Nck)) for the traffic request. When the communication state is good, information may be transmitted/received through the main communication channel. When a positive response (Ack) signal is not received within a preset reception acknowledgment time through the main communication channel, it may be determined as a communication disconnection state for the main communication channel, and a sub communication channel is formed through the private LoRa network.

As such, the buoy 100, the fishing vessel terminal device 200, and the managing vessel terminal device 300 may selectively connect to the commercial LoRa network and the private LoRa network depending on the state or condition of the radio wave or propagation of the radio wave, thereby ensuring a communication speed and communication connectivity.

Figure 5:
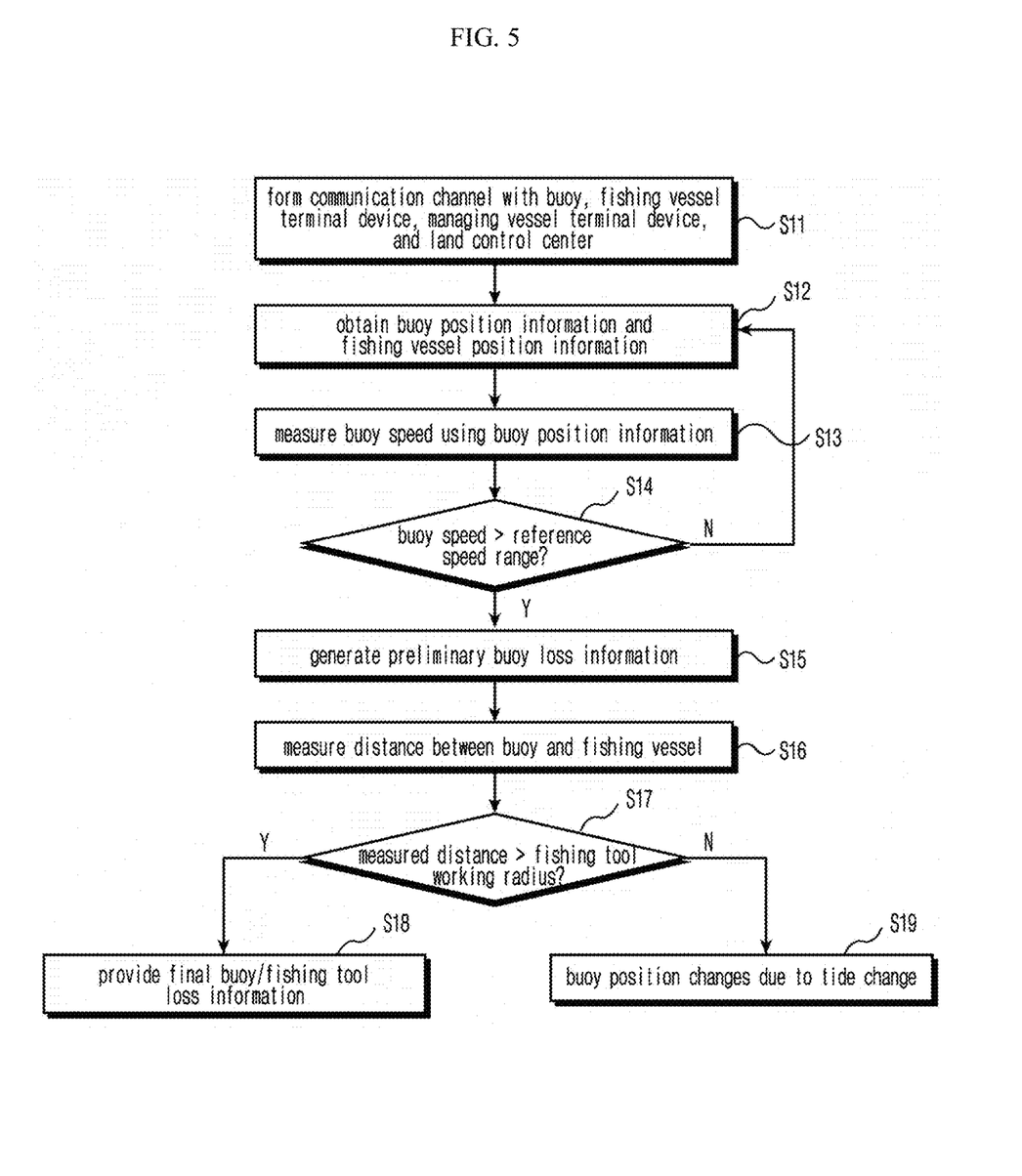
FIG. 5 is a flowchart illustrating a fishing tool loss monitoring method according to an embodiment.

FIG. 5 is a flowchart illustrating a fishing tool loss monitoring method according to an embodiment.

Referring to FIG. 5, in a fishing tool loss monitoring method, the buoy 100, the fishing vessel terminal device 200, the managing vessel terminal device 300, and the land control center 400 form a LoRa-based communication channel to transmit/receive information (S11).

The land control center 400 periodically obtains buoy position information and fishing vessel information in the area which the land control center 400 is in charge (S12) and measures the buoy speed according to the obtained buoy position information (S13). For example, if the land control center 400 obtains buoy position information at point D1 and buoy position information at point D2 after time $t_1$, the buoy speed (or velocity) $V_b$ may be obtained by dividing the traveled distance (i.e., D2−D1) by the time $t_1$.

When the buoy speed is larger than a preset reference speed (e.g., 3 m/s) (S14), the land control center 400 preliminarily determines that the buoy is stolen or lost and generates preliminary buoy loss information (S15). If the buoy speed is the preset reference speed or less, the managing vessel terminal device 300 continuously obtains buoy position information and fishing vessel information through the communication channel to recognize a loss or stealing of the buoy or fishing tool.

When the distance between the fishing vessel and the buoy using the fishing vessel position information and the buoy position information falls outside a preset fishing tool working radius (e.g., about 500 m) according to the preliminary buoy loss information (S17), the land control center 400 generates final buoy or fishing tool loss information and transmits the final buoy or fishing tool loss information to the fishing vessel terminal device 200 or the managing vessel terminal device 300 (S18).

If the current distance between the fishing vessel and the buoy falls within the preset fishing tool working radius after the preliminary buoy loss information is generated (S17), the land control center 400 determines that the vessel is currently working and releases the generation of the preliminary buoy loss information and indicates buoy position change information due to the tide (S18).

Figure 6:
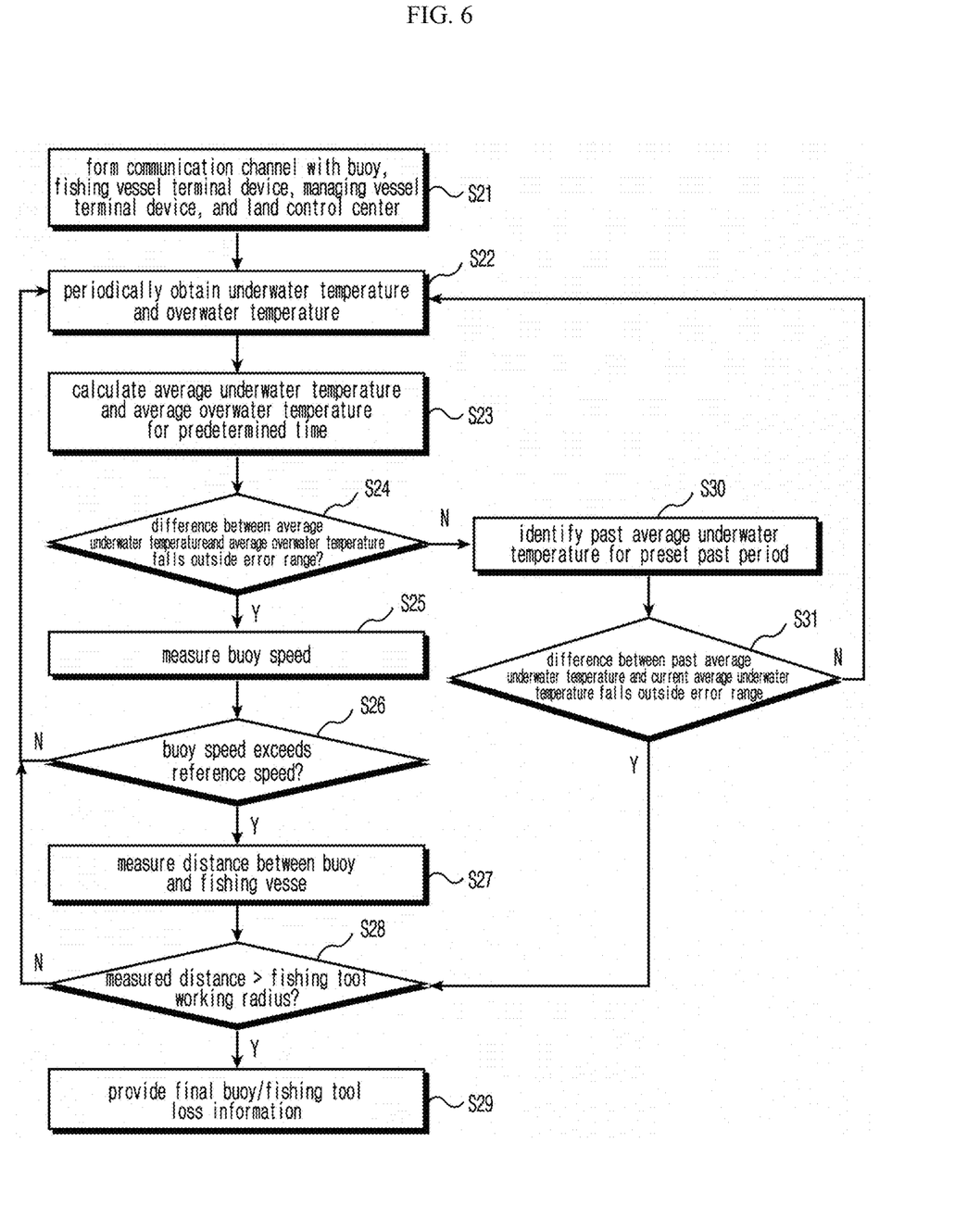
FIG. 6 is a flowchart illustrating a fishing tool loss monitoring method according to an embodiment.

FIG. 6 is a flowchart illustrating a fishing tool loss monitoring method according to an embodiment.

Referring to FIG. 6, the buoy 100, the fishing vessel terminal device 200, the managing vessel terminal device 300, and the land control center 400 form a LoRa-based communication channel to transmit/receive information (S21).

The land control center 400 periodically (e.g., every minute) gathers underwater temperature information and overwater temperature information from the sensor module 120 of the buoy 100 (S22).

The land control center 400 calculates the respective averages ($T_{s-avg}$ and $T_{a-avg}$) of the underwater temperatures Ts and the overwater temperatures Ta gathered for a predetermined period of time (e.g., about 5 hours) (S23) and, if each calculated average ($T_{s-avg}$ and $T_{a-avg}$) falls outside an error range (or a threshold), measure the buoy speed Vb (S24 and S25). In this case, the error range may have a value of '1', and may be set through a machine learning-based algorithm or an experiment for a predetermined period of time. To learn the error range for the underwater temperature and overwater temperature, underwater temperature data may be gathered using a marine meteorological observation data lookup service, and overwater temperature data may be gathered through the Meteorological Agency, and then the gathered data is used as training data. The difference between the underwater temperature average and the overwater temperature average per for each time may be stored and determined as a reference for the error range using a machine learning-based algorithm, e.g., a convolutional neural network (CNN).

If the buoy speed falls out of a preset reference speed (or speed range) (e.g., 3 m/s) (S26), the land control center 400 generates preliminary buoy loss information and determines that the buoy 100 is suspicious of having come out of the water and measures the distance between the buoy 100 and the fishing vessel using the buoy position information and the fishing vessel position information (S27). If the buoy 100 is equipped with a water detection sensor, the land control center 400 may identify whether the buoy has come out of the water using the water detection sensor. However, even when there is no water detection sensor, steps S22 to S25 may be performed to identify whether the buoy is current under the water or over the water using the temperature sensor basically built in the buoy.

If the distance between the buoy and the fishing vessel exceeds the fishing tool working radius (S28), the land control center 400 generates final buoy or fishing tool loss information and provides the buoy or fishing tool loss information to the managing vessel terminal device 300, the fishing vessel terminal device 200, or the manager's terminal (S29). If the distance between the buoy and the fishing vessel is within the fishing tool working radius, the land control center 400 determines that the fishing vessel is currently working.

When each calculated average value $T_{s\text{-}avg}$ and $T_{a\text{-}avg}$ falls within the error range (S24), the land control center 400 calculates the average ($T_{Past(s\text{-}avg)}$) of the underwater temperatures in the same time period for the past three days (S30).

If the difference between $T_{Past(s\text{-}avg)}$ and $T_{s\text{-}avg}$ falls outside the error range (e.g., '1') (S31), the land control center 400 determines whether the distance between the buoy and the fishing vessel exceeds the fishing tool working radius (S28) and, if so (yes in S28), the land control center 400 generates final buoy or fishing tool loss information and provides the buoy or fishing tool loss information to the managing vessel terminal device 300, the fishing vessel terminal device 200, or the manager's terminal (S29). If the distance between the buoy and the fishing vessel is within the fishing tool working radius, the land control center 400 determines that the fishing vessel is currently working.

Steps S11 to S19 of FIG. 5 and steps S21 to S31 of FIG. 6 may be divided into additional sub-steps or may be combined into fewer steps according to embodiments of the disclosure. Further, some of the steps may be omitted as necessary, or the order of the steps may be changed.

The above-described embodiments may be implemented in the form of recording media including computer-executable instructions, such as program modules. The computer-readable medium may be an available medium that is accessible by a computer. The computer-readable storage medium may include a volatile medium, a non-volatile medium, a separable medium, and/or an inseparable medium. The computer-readable storage medium may include a computer storage medium. The computer storage medium may include a volatile medium, a non-volatile medium, a separable medium, and/or an inseparable medium that is implemented in any method or scheme to store computer-readable commands, data architecture, program modules, or other data or information.

Although embodiments of the disclosure have been described with reference to the accompanying drawings, It will be appreciated by one of ordinary skill in the art that the disclosure may be implemented in other various specific forms without changing the essence or technical spirit of the disclosure. Thus, it should be noted that the above-described embodiments are provided as examples and should not be interpreted as limiting. Each of the components may be separated into two or more units or modules to perform its function(s) or operation(s), and two or more of the components may be integrated into a single unit or module to perform their functions or operations.

It should be noted that the scope of the disclosure is defined by the appended claims rather than the described description of the embodiments and include all modifications or changes made to the claims or equivalents of the claims.

What is claimed is:

1. A fishing tool loss monitoring system, comprising:
   at least one buoy detachably installed in a fishing tool installed in the water, providing sensing information using at least one sensor, and providing buoy identification information and buoy position information;
   a fishing vessel terminal device registering fishing tool identification information in the at least one buoy, communicating with the at least one buoy to identify the buoy position information, and providing fishing vessel information including fishing vessel identification information, fishing vessel position information, the fishing tool identification information, and the buoy position information; and
   a land control center performing a function of managing the fishing tool or a fishing vessel in a preset control area, transmitting/receiving information to/from the fishing vessel terminal device or the buoy through a communication network to gather the sensing information including underwater temperature information and overwater temperature information from the buoy during a preset time, measuring a speed of the buoy using the buoy position information when a difference between respective averages of the underwater temperature information and the overwater temperature information falls outside a preset error range, generating preliminary buoy loss information if the measured speed of the buoy falls outside a preset reference speed range, and providing buoy or fishing tool loss information when a distance between the fishing vessel and the buoy falls outside a preset fishing tool working radius using the fishing vessel position information and the buoy position information according to the generation of the preliminary buoy loss information, wherein when the distance between the fishing vessel and the buoy using the fishing vessel position information and the buoy position information falls within the preset fishing tool working radius after the preliminary buoy loss information is generated, the land control center releases the generation of the preliminary buoy loss information and provides buoy position change information due to a tide.

2. The fishing tool loss monitoring system of claim 1, wherein
   the buoy, the fishing vessel terminal device, and a managing vessel terminal device performing a function of managing fishery, including managing the buoy or the fishing tool in a control area of the managing vessel terminal device form a main communication channel through a public long range (LoRa) network for low-power wide-area communication and, in a radio wave shadow area, release the main communication channel with the public LoRa network and form a sub communication channel through a private LoRa network.

3. The fishing tool loss monitoring system of claim 2, wherein
   the buoy, the fishing vessel terminal device, and the managing vessel terminal device determine a communication state through a positive/negative response signal for a traffic request and, if the positive response signal is not received within a preset reception acknowledgment time through the main communication channel, determine that the main communication channel is a communication disconnected state and form the sub communication channel through the private LoRa network.

4. A fishing tool loss monitoring method for monitoring a loss of a buoy or a fishing tool using the buoy, the fishing tool loss monitoring method comprising:

forming, by a land control center, a LoRa-based communication channel with a fishing vessel terminal device, a managing vessel terminal device, and the buoy, the land control center periodically obtaining buoy position information and fishing vessel information in a preset control area of the land control center and detecting and indicating, on land, whether the buoy or the fishing tool is lost, the fishing vessel terminal device registering fishing tool identification information in the buoy and managing the fishing tool identification information, the managing vessel terminal device installed in a managing vessel to perform a fishery guidance or control in a control area of the managing vessel terminal device and recover the lost fishing tool through fishing tool scanning according to buoy or fishing tool loss information, and the buoy installed in the fishing tool to provide sensing information using at least one sensor;

periodically obtaining, by the land control center, the sensing information or the buoy position information through the communication channel, gathering the sensing information including underwater temperature information and overwater temperature information from the buoy during a preset time, measuring a speed of the buoy using the buoy position information when a difference between respective averages of the underwater temperature information and the overwater temperature information falls outside a preset error range, and generating preliminary buoy loss information if the measured speed of the buoy falls outside a preset reference speed range;

when a distance between the fishing vessel and the buoy using the fishing vessel position information and the buoy position information falls outside a preset fishing tool working radius according to the generation of the preliminary buoy loss information, generating the buoy or fishing tool loss information and transmitting the buoy or fishing tool loss information to the fishing vessel terminal device or the managing vessel terminal device, by the land control center; and when the distance between the fishing vessel and the buoy using the fishing vessel position information and the buoy position information falls within the preset fishing tool working radius after the preliminary buoy loss information is generated, releasing the generation of the preliminary buoy loss information and providing buoy position change information due to a tide, by the land control center.

5. The fishing tool loss monitoring method of claim 4, further comprising, when the difference between the respective averages of the underwater temperature information and the overwater temperature information falls within the preset error range, fetching a past average underwater temperature for a preset past time, comparing the past average underwater temperature with a current average underwater temperature and, when a result of the comparison falls outside an error range, generating the preliminary buoy loss information.

* * * * *